(No Model.)
J. W. KEENEY.
ORANGE GRADER.
No. 348,128. Patented Aug. 24, 1886.
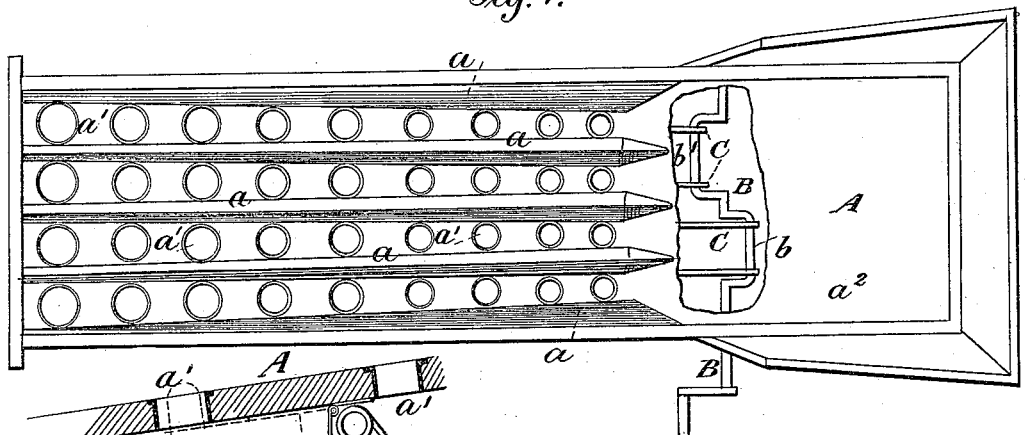
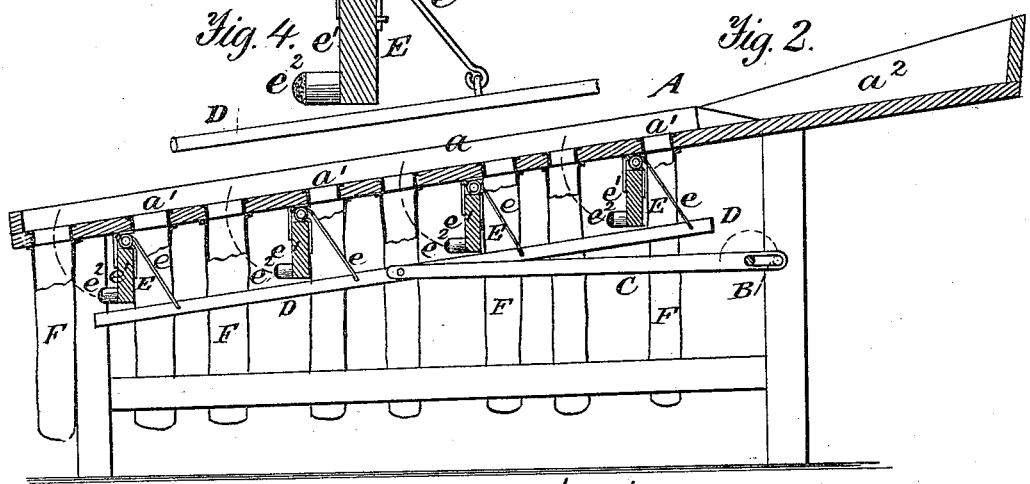
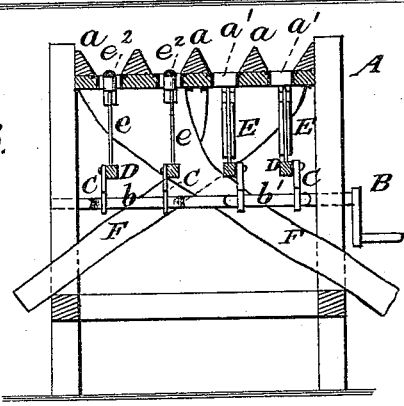
Witnesses.
A. Ruppert.
A. E. Grant.
Inventor:
John W. Keeney
Per
Thomas P. Simpson
atty

UNITED STATES PATENT OFFICE.

JOHN W. KEENEY, OF RIVERSIDE, CALIFORNIA, ASSIGNOR OF ONE-HALF TO J. R. NEWBERRY, OF SAME PLACE.

ORANGE-GRADER.

SPECIFICATION forming part of Letters Patent No. 348,128, dated August 24, 1886.

Application filed January 11, 1886. Serial No. 188,199. (No model.)

*To all whom it may concern:*

Be it known that I, JOHN W. KEENEY, a citizen of the United States, residing at Riverside, in the county of San Bernardino and State of California, have invented a certain new and useful Orange-Grader; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

The special object of the invention is to grade oranges and other fruits into different sizes, the same being also adapted to be used with some kinds of vegetables.

Figure 1 of the drawings is a top plan view of the grader; Fig. 2, a longitudinal vertical section; Fig. 3, a vertical cross-section, and Fig. 4 a detail view in longitudinal vertical section.

In the drawings, A represents an inclined plane or board, having the longitudinal partitions $a$, and between these the holes $a'$, of which the transverse rows increase in size as they approach the bottom. Thus it will be seen that as the fruit or vegetables enter the passages between partitions $a$ the smallest will drop through the first holes, the larger ones continuing their course until a corresponding hole is reached. In this way any desired number of grades may be obtained by making suitable holes or plugging up such as are not wanted at any particular time.

$a^2$ is the feed-board.

B is a hand crank-shaft, having two opposite cranks, $b\ b'$, to which are pivoted the rods C, which are themselves pivoted to the long rods D. To the latter are pivoted angle-levers E, having the spring-arms $e$ and rigid arms $e'$, the latter being provided with end-cushioned knockers $e^2$ at an angle thereto. When the crank-shaft is turned, the knockers $e^2$ are carried up through and above the holes $a'$, as shown in Fig. 4 of the drawings, so as not only to throw out such fruit as may have lodged, but also to hold back the rest in the passage-way until the holes are open. The whole number of levers with their knockers may be operated simultaneously; but I prefer to actuate half on the forward and half on the backward reciprocation of the rods C. I make one arm of each lever E a spring and cushion the ends of knockers $e^2$, so as to prevent the fruit from being bruised.

F are spouts connecting with holes $a'$ and conveying the graded sizes of fruit to their respective boxes or other receptacles. They are slotted so as to allow the knockers $e^2$ and arms $e'$ to pass through them; but these slots are not sufficiently large to permit the escape of any fruit or vegetable.

Having described my invention, what I claim as new, and desire to protect by Letters Patent, is—

1. The combination, in a grader, of an inclined plane having holes $a'$, the end-cushioned knockers $e^2$, and mechanism adapted to operate them, as and for the purpose specified.

2. The combination, in a grader, with an incline having holes, and knockers $e^2$, of levers having one arm made elastic to prevent the striking force from bruising the fruit or vegetable, as described.

3. A fruit and vegetable grader consisting, essentially, of an inclined plane having longitudinal partitions $a$ and intermediate holes, $a'$, knockers to dislodge the fruit from said holes, and mechanism to operate said knockers, substantially as shown and described.

In testimony whereof I affix my signature in presence of two witnesses.

JOHN W. KEENEY.

Witnesses:
T. H. B. CHAMBLIN,
JAMES P. GRAVES.